(12) United States Patent
Domotor

(10) Patent No.: US 6,772,879 B1
(45) Date of Patent: Aug. 10, 2004

(54) STANDING CASE FOR PERSONAL DIGITAL ASSISTANT

(75) Inventor: Agnes Csilla Domotor, Jamaica Plain, MA (US)

(73) Assignee: The Gem Group, Inc., Lawrence, MA (US)

( * ) Notice: Subject to any disclaimer, the term of this patent is extended or adjusted under 35 U.S.C. 154(b) by 0 days.

(21) Appl. No.: 10/179,594

(22) Filed: Jun. 25, 2002

(51) Int. Cl.[7] .............................................. B65D 85/30
(52) U.S. Cl. ..................... 206/45.23; 206/320; 206/722
(58) Field of Search ................................ 206/305, 320, 206/701, 576, 722, 723, 45.2, 45.23

(56) References Cited

U.S. PATENT DOCUMENTS

| | | | | |
|---|---|---|---|---|
| 754,227 A | * | 3/1904 | Moog | 211/2 |
| 1,613,536 A | * | 1/1927 | Rose | 132/315 |
| 4,259,568 A | * | 3/1981 | Dynesen | 206/45.2 |
| 5,445,266 A | * | 8/1995 | Prete et al. | 206/320 |
| 5,887,723 A | * | 3/1999 | Myles et al. | 206/760 |
| 6,494,321 B1 | * | 12/2002 | Sadow et al. | 206/320 |

* cited by examiner

*Primary Examiner*—Jacob K. Ackun, Jr.
(74) *Attorney, Agent, or Firm*—Cesari and McKenna, LLP; William A. Loginov

(57) ABSTRACT

A case for a personal digital assistant (PDA) that allows the PDA to be elevated in an angled standing position when the case is opened is provided. In this manner, the PDA is presented to the user in an easily accessed orientation without the need to remove the personal digital system from the case or to attach any separate stand or bracket. In an illustrative embodiment, the case includes a base section and a cover that is attached in a hinged manner to the base section. The cover can be folded back to reveal the enclosed PDA screen and buttons. When the cover is rotated back to a predetermined position, at which the base and cover form an acute angle, a securing strap is attached between the base and the cover preventing the base and cover from spreading apart beyond the pre-determined acute angle.

11 Claims, 4 Drawing Sheets

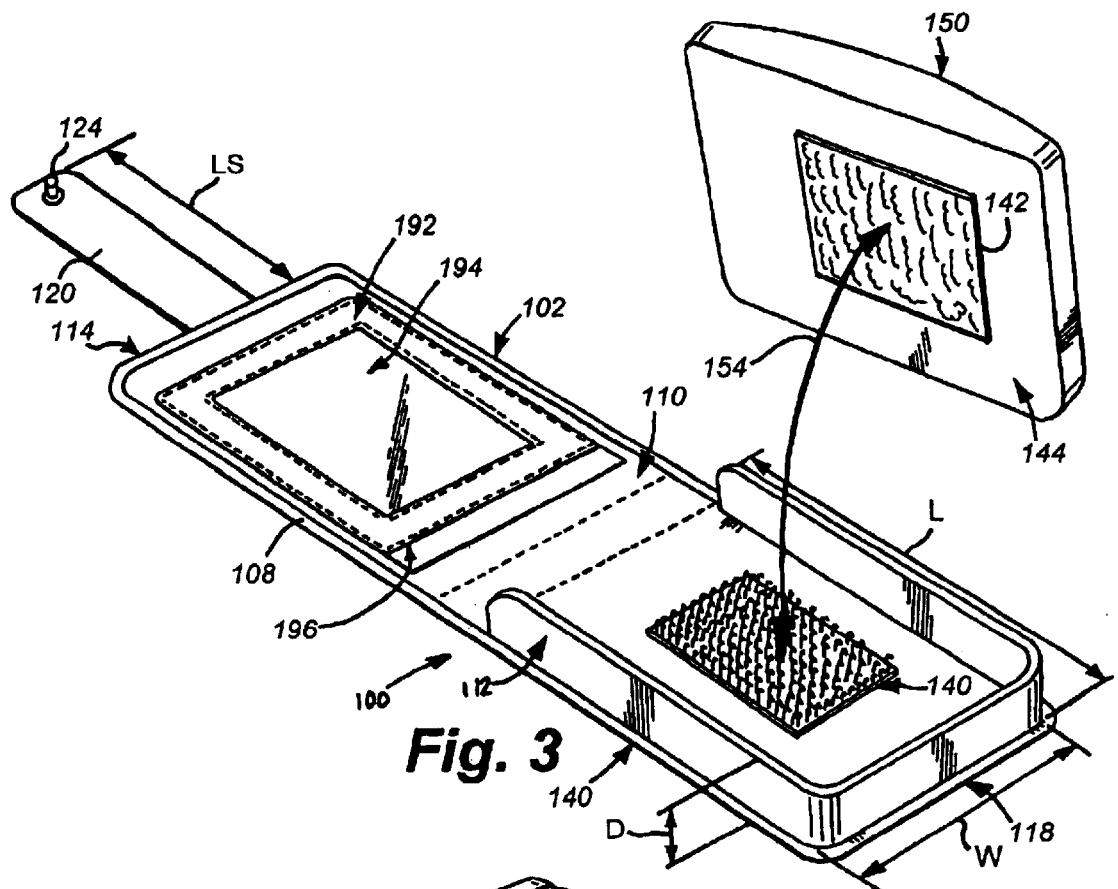
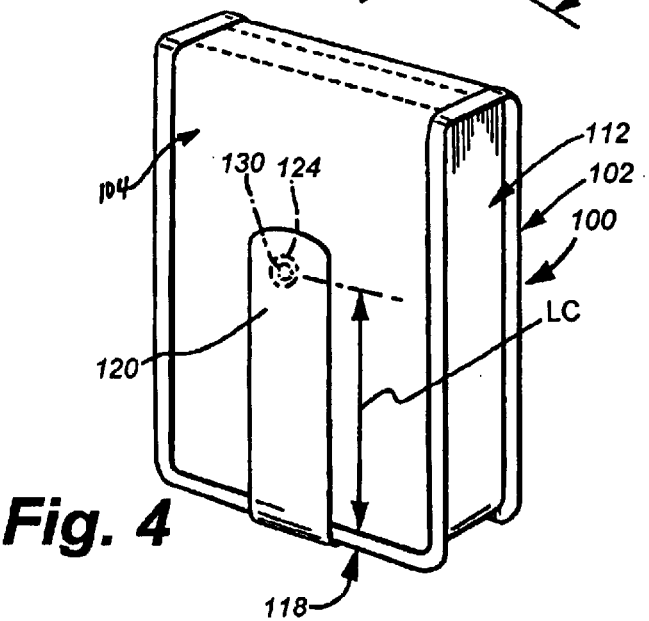

STANDING CASE FOR PERSONAL DIGITAL ASSISTANT

BACKGROUND OF THE INVENTION

1. Field of the Invention

This invention relates to portable cases, and more particularly to cases for personal digital assistants.

2. Background Information

Personal digital assistants are compact computers designed to be carried easily in a purse, brief case or pocket. In recent years, they have become an essential item for both business and non-business users. Personal digital assistants (PDAs) typically include a grayscale or color screen capable of displaying a variety of graphical user interface buttons that can be activated and/or manipulated using a finger or small stylus with a blunted point. PDAs are adapted to perform a variety of functions including organizing, computing, paging, cellular communication, Internet browsing and even global positioning.

The versatility and size of PDAs makes it easy to carry them virtually every where. As such, they are likely to encounter bad weather, rough handling, sand, dirt and dust. To prevent permanent damage to the screen, buttons and various communication ports, it is common to place the PDA into a closable case. The case affords reasonable protection when the PDA is not in use.

Presently, cases are limited in function to simply protecting the PDA when not in use. Providing additional functions that would aid the user in employing his or her PDA are highly desirable.

SUMMARY OF THE INVENTION

This invention overcomes the disadvantages of the prior art by providing a case for a personal digital assistant (PDA) that allows the PDA to be elevated in an angled standing position when the case is opened. In this manner, the PDA is presented to the user in an easily accessed orientation without the need to remove the personal digital system from the case or to attach any separate stand or bracket.

In an illustrative embodiment, the case includes a base section and a cover that is attached in a hinged manner to the base section. The cover can be folded back to reveal the enclosed PDA screen and buttons. When the cover is rotated back to a predetermined position, at which the base and cover form an acute angle, a securing strap is attached between the base and the cover preventing the base and cover from spreading apart beyond the predetermined acute angle.

The securing strap can be attached to the same attachment point when the base and cover are in a closed position. A male and female snap or another appropriate inter-engaging closure assembly can define the attachment point. The side of the case can include an elastic webbing pocket for receiving the stylus and additional pockets in the form of moveable flaps can be provided within the interior of the case. These flaps can be moved toward and away from the PDA via a hinged attachment to the interior of the case.

BRIEF DESCRIPTION OF THE DRAWINGS

The invention description below refers to the accompanying drawings, of which:

FIG. 3 is an exploded perspective view of the case in an opened position showing the removable attachment of a personal digital assistant;

FIG. 4 is a rear perspective view of the case showing the closure strap in further detail;

DETAILED DESCRIPTION OF AN ILLUSTRATIVE EMBODIMENT

Figure 1:
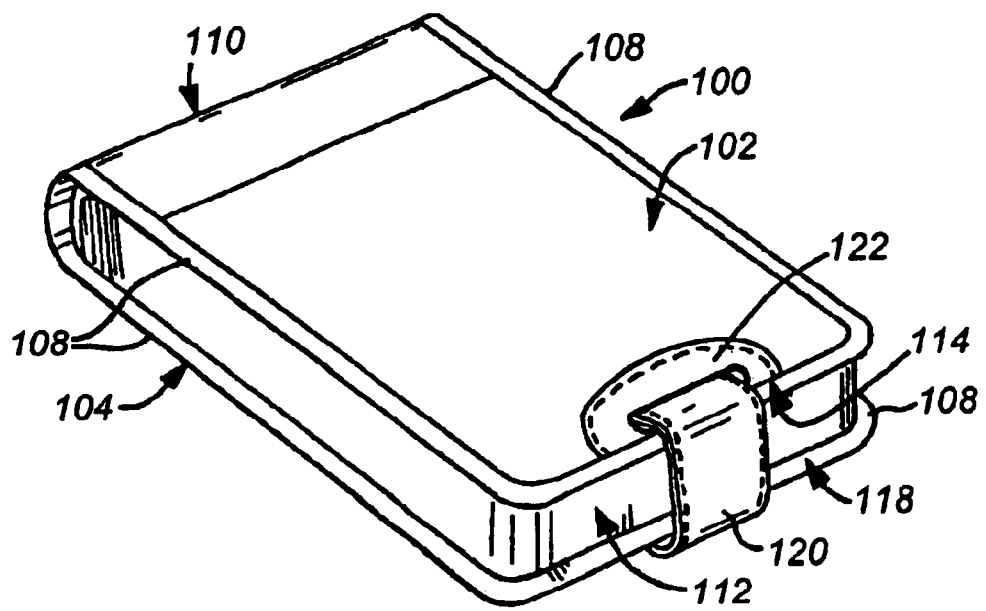
FIG. 1 is a perspective view of the personal digital assistant case showing the closure side.
Figure 2:
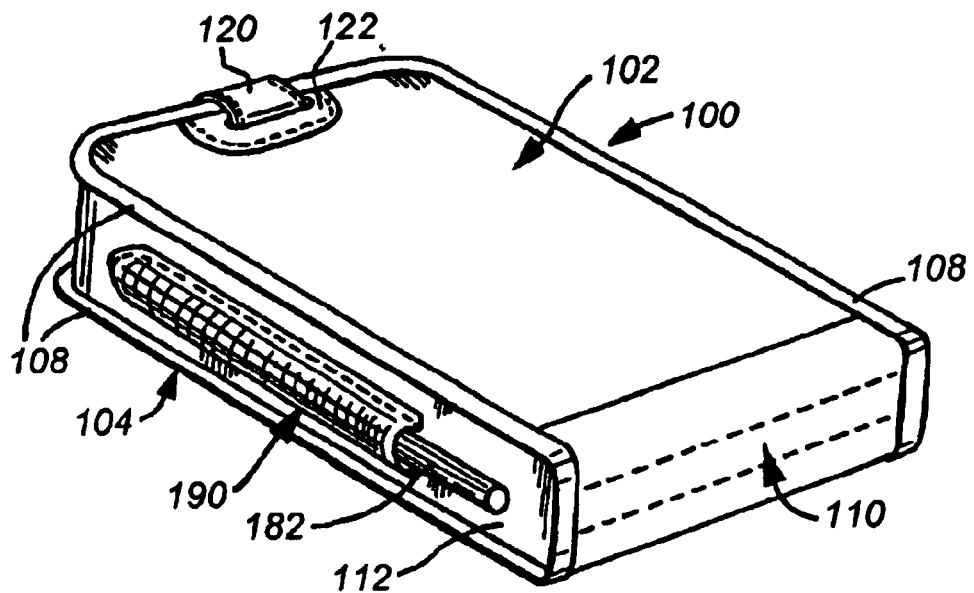
FIG. 2 is a perspective view of the case showing the hinge side.

A standing case for a personal digital assistant (PDA) according to an illustrative embodiment of this invention is shown in a closed position in FIGS. 1 and 2. The case 100 can be constructed from a variety of materials including simulated or natural leather, cloth, metal (aluminum, for example), plastic or a combination of these materials. In this example, the case is constructed from simulated leather on its outer surfaces with both decorative and functional stitching where appropriate and synthetic cloth used for linings and for wrapping solid surfaces (such as the side edge-described below). These materials are described further below.

The case 100 includes a cover 102 and a base 104. The interior of the cover 102 and base 104 can be constructed from a rigid or semi-rigid material such as fiberboard or polystyrene. As noted above, the rigid interiors can be covered with a simulated leather or similar ascetically pleasing covering. The covering can include a padding material to give the case a softer/cushioned feel.

The cover 102 and base 104 can be edged with an appropriate binding 108. The cover is secured to the base along a hinged rear 110 and is otherwise unconnected to a side edge 112 that extends around the case 100 from one side of the hinged section 110 to the other side. The side edge can comprise a stiff metal or plastic bracket wrapped with a fabric lining. A variety of other materials, wrapped or unwrapped, can be substituted. With reference also to FIGS. 3 and 4, the cover 102, when opened exposes the interior of the case, which is bounded on three sides by the side edge 112. The area adjacent the hinge section 110 is open in this embodiment. In an alternate embodiment, the side edge can extend across this section as well. The hinge is sufficiently long to enable it to wrap over the side edge and enable the front end 114 of the cover 102 to be made flush with the front end 118 of the base when the case is closed. As shown, the hinged section 110 can be formed using a plurality of stitched seams. Typically, the hinged section is free of any rigid members although a semi-flexible member may be employed within the hinged section to add strength. Extending from the front of the cover is a securing strap 120. The securing strap can be anchored to the cover at a reinforced securing point 122 that includes decorative and/or functional stitching. In an illustrative embodiment, the securing strap is approximately 1 inch to 1½ inch in width. However, this dimension is highly variable.

The securing strap includes a male snap connector 124 at its distal end. This male connector is adapted to engage a corresponding female connector 130 (see FIG. 5) located on the back of the base 104. As shown generally in FIG. 4, when the strap is secured around the back of the base in the manner illustrated, it securely closes the case with all side edges fully sealed. The interior of the case (FIG. 3) is lined with an appropriate fabric and includes a rectangular piece of hook and loop material 140. This hook and loop material piece 140 can be stitched to the base or adhered using an appropriate adhesive. In one example, a hook and loop material having a self-adhesive bank backing can be used. The corresponding hook and loop material piece 142 is placed in an appropriate position (typically by the user) on the rear side 144 of an appropriate PDA 150. The PDA can be selectively attached to and removed from (double arrow 154) the interior of the case as desired by applying sufficient attachment pressure or detachment tension between the PDA and the case. When attached to the interior, the PDA is secure against unwanted movement within the interior. The dimensions of the interior are sized sufficiently to receive the PDA, and to allow closure of the case without deforming either the PDA or the case. The dimensions can be oversized with respect to the PDA, but are typically kept within a range approximately proportional to the PDA. The size can be selected to accommodate a large variety of PDAs, or it can be customized to accommodate specific models or brands of PDAs. Likewise, while the term "PDA" or "personal digital assistant" is used throughout this application, it should be taken as exemplary and it is expressly contemplated that this case can be adapted in size to accommodate a variety of electronic devices. Accordingly, where the term portable electronic device is used, it should be take broadly to include a variety of such devices. In the illustrated example, the case has a width W of approximately 3⅝ inches, a length L of approximately 5¼ inches and a depth D of approximately ¾ inch. The strap has a length LS, from the cover's front edge 114 to the male snap 124, of approximately 4½–5 inches, and the female snap 130 is located at a length LC from the base's front edge 118 that is approximately 2¾ inches. Note that the male and female snaps 124 and 130, respectively, can be substituted for any acceptable interengaging closure assembly including a hook and loop material. Likewise, the deployment of the closures on the strap and base can be reversed so that the female snap is on the strap and vice versa.

Figure 5:
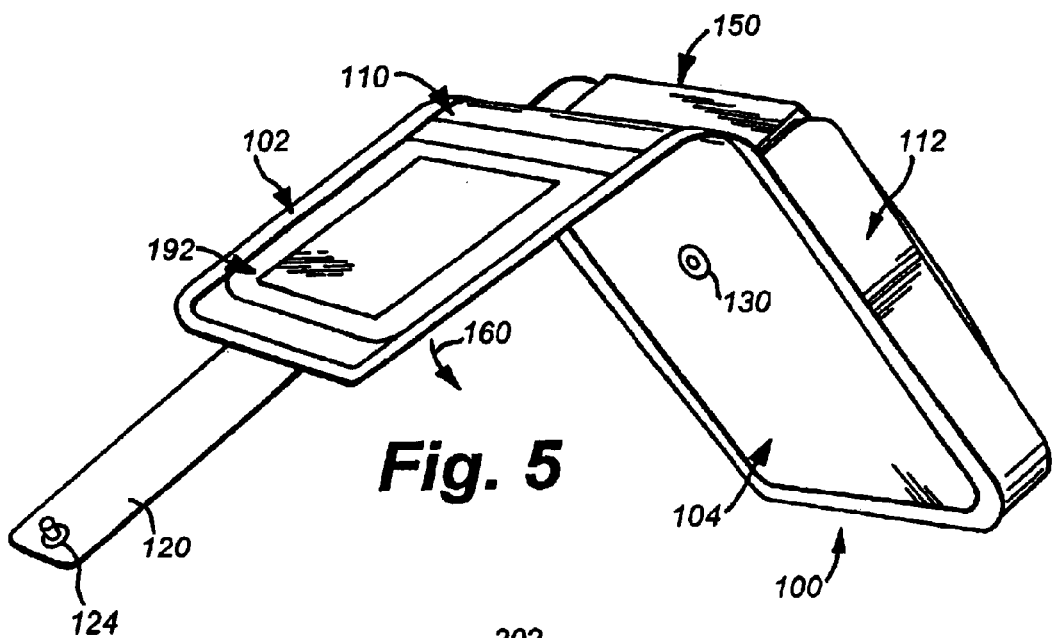
FIG. 5 is a rear perspective view of the case showing the cover in a partially opened position.
Figure 6:
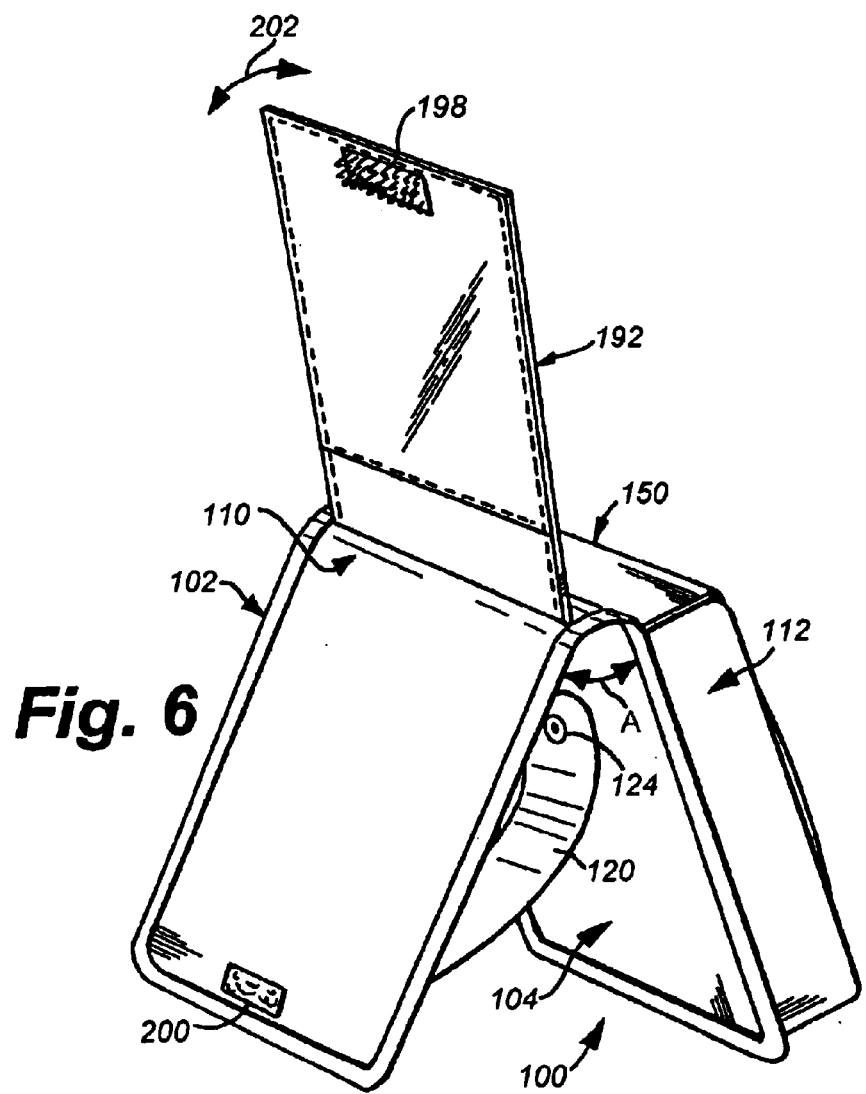
FIG. 6 is a rear perspective view of the case showing the cover attached to the base in a standing position with a moveable pocket exposed.
Figure 7:
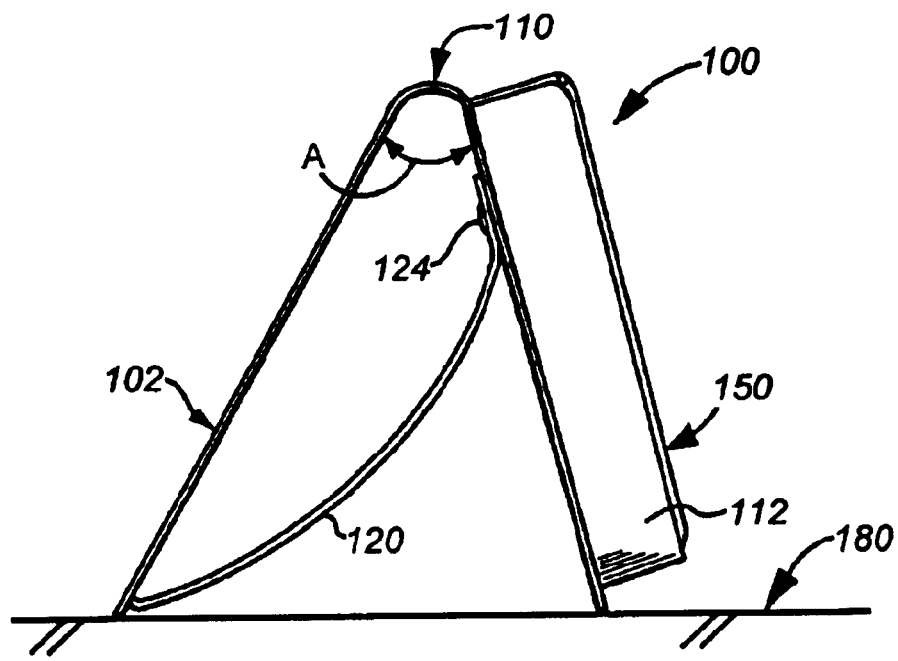
FIG. 7 is a side view of the case in a standing position.
Figure 8:
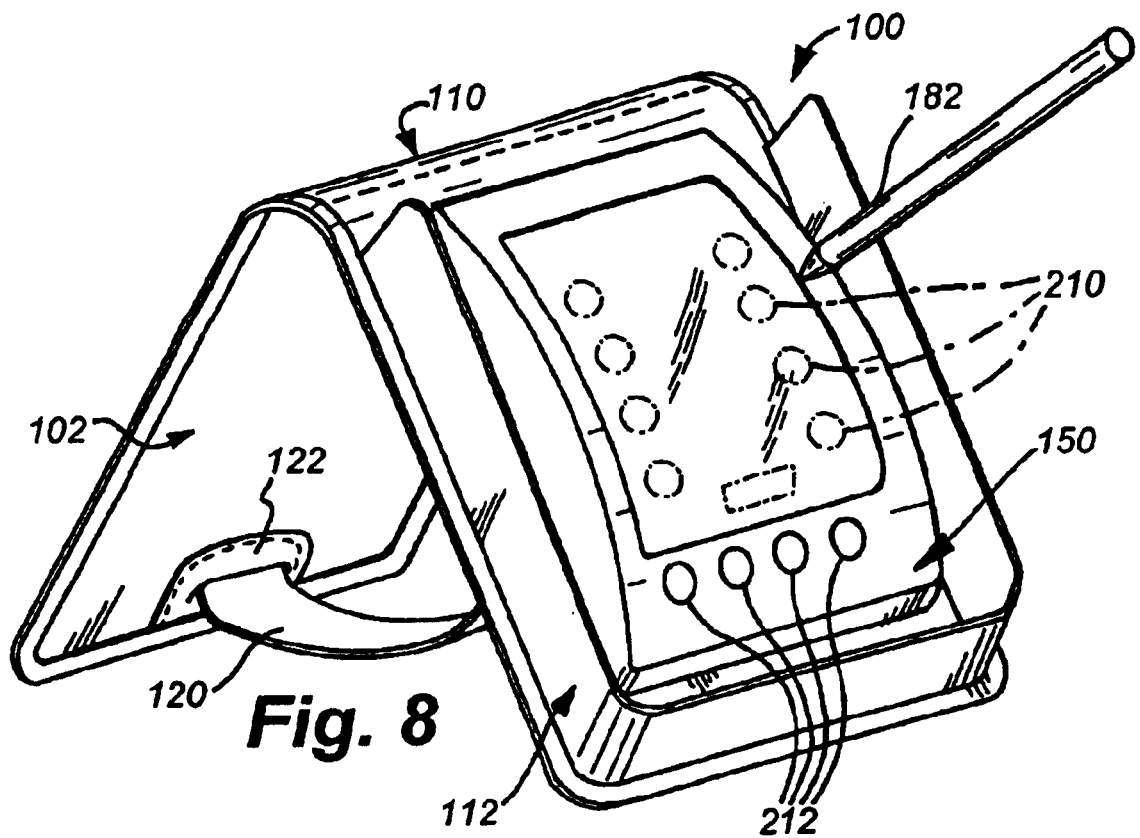
FIG. 8 is a front perspective view of the case in a standing position with the personal digital assistant accessible to a user.

Referring to FIGS. 5 and 6, the cover 102 can be hinged rearwardly along the hinge section 110 away from the face of the PDA 150 as shown (curved arrow 160). When it attains an appropriate acute angle a, typically between 20 and 50 degrees in one example (see FIG. 6). The male snap 124 is brought into sufficiently close proximity to the female snap 130 so that the two snaps can be joined. In this manner, the strap 120 acts to restrain the cover 102 against movement rotationally back toward the face of the PDA 150. Hence, as shown generally in FIGS. 6–8, the PDA is supported in a standing position at an angle with respect to an appropriate supporting surface 180 (FIG. 7). In this position, the user is free to employ the stylus 182 (FIG. 8) or his or her fingers to operate the PDA graphical user interface screen buttons 210 (shown in phantom), and various pushbuttons 212. Since the PDA is secured by the hook and loop material, it is restrained against sliding or moving within the interior of the opened, standing case.

A variety of options can be provided to the case. For example, as shown in FIG. 2, a piece of elastic web or simulated leather can be stitched or otherwise attached to one side of the case to form a stylus pocket 190. Similarly, a pocket can be provided to the interior of the case (not shown). Likewise, one or more internal flaps 192 can be provided. These internal flaps can be used to hold records, instructions or important documents. The flap 192 (as shown) has a clear plastic window 194 surrounded by a stitched border. A pocket opening 196 (FIG. 3) allows documents to be slid into the flap for viewing through the clear window 194. The flap can include a piece of hook and loop fastener material 198 that is joined to a corresponding piece of hook and loop fastener material 200 on the inside of the cover 102. When detached, the flap can move rotationally (double arrow 202) with respect to the hinge section 110. Additional flaps or pockets can also be provided. When not in use, the flap or flaps can be secured to the inside of the cover so that they do not interfere with the face of the PDA as the cover is opened and placed into the illustrated standing position.

The foregoing has been a detailed description of an illustrative embodiment of this invention. Various modifications and additions can be made without departing from the spirit and scope of this invention. For example, the PDA or other electronic device can be secured to the interior of the pocket using straps, snaps or other attachment mechanisms. Alternatively, the PDA can be freely deployed within the interior using no attachment mechanisms. In addition, various ornamental details and/or functional strengtheners can be provided to the interior or exterior of the case to facilitate standing on rough surfaces and survival in harsh environments. Accordingly, this description is meant to be taken only by way of example and not to otherwise limit the scope of this invention.

What is claimed is:

1. A case for a personal digital assistant having a display screen and a user interface comprising:

a base;

a side edge comprising a rigid material that extends around at least three sides of the base so as to define an interior for receiving the personal digital assistant thereinto, the base and the side edge adapted to hold the personal digital assistant while revealing the display screen and the user interface and allowing the user to operate the personal digital assistant;

a hinged cover adapted to selectively overlay and enclose the interior so as to cover the display screen and the user interface of the personal digital assistant; and a securing strap attached to the cover and having a first means for interengaging adapted to removably engage a second means for interengaging, the second means for interengaging being located along an outer-facing side of the base, wherein the strap, the first means for interengaging and the second means for interengaging are each constructed and arranged so that the strap secures the cover against the side edge in a closed position when the strap extends around the side edge and along the outer-facing side of the base with the first means for interengaging engaging the second means for interengaging, and wherein the strap, with the first means for interengaging engaging the second means for interengaging secures the cover at a predetermined acute angle when the cover is opened away from the side edge so that the base and the cover define a stand that elevates the electronic device at an angle with respect to a supporting surface.

2. The case as set forth in claim 1, wherein the interior includes a fastener material for interengaging a corresponding piece of fastener material mounted to the personal digital assistant to enable the personal digital assistant to be selectively attached to and removed from the interior.

3. The case as set forth in claim 2, wherein the attachment material comprises a hook and loop fastener material.

4. The case as set forth in claim 1, wherein the side edge includes a pocket for a personal digital assistant stylus.

5. The case as set forth in claim 4, further comprising a pocket that is removably attached to an inner-facing face of the cover and that is moveable mounted to the hinge section.

6. The case as set forth in claim 4, wherein the first and second means for interengaging comprises a male and female snap connector.

7. The case as set forth in claim 4, wherein the base and the cover are rigid members having an outer material covering.

8. A standing case for a personal digital assistant comprising:
- a base that defines an interior for mounting the personal digital assistant, the base adapted to hold the personal digital assistant while allowing a user to access the personal digital assistant;
- a hinged cover adapted to selectively overlay and enclose the interior;
- a securing strap mounted to the hinged cover along a front, opposite a hinge section, the securing strap being constructed and arranged to be secured by a first means for interengaging to a second means for interengaging on an outer face of the base in a closed position and to allow the base and the cover to be secured at a predetermined acute angle with respect to eachother in an opened position with the securing strap secured to the outer-facing face of the base so as to prevent separation beyond the predetermined acute angle of the cover with respect to the base; and
- a stylus pocket located on the side edge of the base.

9. The standing case as set forth in claim 8, further comprising a strip of adhesive hook and loop fastener material mounted on the base for interengaging a corresponding piece of fastener material mounted to the personal digital assistant for removably securing the personal digital assistant within the interior.

10. The standing case as set forth in claim 9, further comprising an internal pocket mounted to the hinged section and removably secured to an inner-facing face of the cover.

11. The standing case as set forth in claim 8, wherein the side edge comprises a rigid material that extends around at least three sides of the base, and ending at the hinged section so as to define the interior.

* * * * *